United States Patent [19]

Nagasawa

[11] Patent Number: 5,609,671
[45] Date of Patent: Mar. 11, 1997

[54] WATER-BASED PIGMENT INK AND PROCESS FOR PRODUCING THE SAME

[75] Inventor: Toshiyuki Nagasawa, Yawata, Japan

[73] Assignee: Orient Chemical Industries, Ltd., Osaka, Japan

[21] Appl. No.: 566,168

[22] Filed: Dec. 1, 1995

Related U.S. Application Data

[63] Continuation-in-part of Ser. No. 492,798, Jun. 20, 1995, abandoned.

[30] Foreign Application Priority Data

Jun. 20, 1994 [JP] Japan .................................. 6-136943

[51] Int. Cl.$^6$ .................................................. C09D 11/02
[52] U.S. Cl. ..................... 106/20 R; 106/20 C; 106/476; 106/478
[58] Field of Search ................ 106/20 R, 20 C, 106/476, 478

[56] References Cited

U.S. PATENT DOCUMENTS

| | | | |
|---|---|---|---|
| 2,439,442 | 4/1948 | Amon et al. | 23/209.1 |
| 2,614,533 | 6/1953 | Cines et al. | 106/478 |
| 2,816,046 | 12/1957 | Damusis | 106/476 |
| 3,023,118 | 2/1962 | Donnet | 106/476 |
| 3,279,935 | 10/1966 | Daniell et al. | 106/478 |
| 3,791,840 | 2/1974 | Barr | 106/478 |
| 3,988,378 | 10/1976 | Wiggins | 106/478 |
| 4,366,138 | 12/1982 | Eisenmenger et al. | 106/476 |
| 5,184,148 | 2/1993 | Suga et al. | 106/20 R |

FOREIGN PATENT DOCUMENTS

| | | |
|---|---|---|
| 0429828 | 6/1991 | European Pat. Off. |
| 7018991 | 1/1972 | Netherlands |

OTHER PUBLICATIONS

Derwent Publications AN 89–215747[30], Jun. 1989.
Derwent Publications AN 93–269953[34], Jul. 1993.
Derwent Publications AN 91–248093[34], Jul. 1991.
Derwent Publications AN 75–69554W[42], Mar. 1975.

*Primary Examiner*—Helene Klemanski
*Attorney, Agent, or Firm*—Birch, Stewart, Kolasch & Birch, LLP

[57] ABSTRACT

Water-based pigment ink having high concentration which provides excellent jetting stability when using for ink-jet printer and provides excellent writing stability when using for fine-point pen was provided.

The water-based pigment ink comprises water and carbon black, wherein said carbon black has a surface active hydrogen content of not less than 1.5 mmol/g.

17 Claims, No Drawings

WATER-BASED PIGMENT INK AND PROCESS FOR PRODUCING THE SAME

This application is a continuation-in-part of application Ser. No. 08/492,798 filed on Jun. 20, 1995, now abandoned, the entire contents of which are hereby incorporated by reference.

FIELD OF THE INVENTION

The present invention relates to water-based ink. More particularly, the present invention relates to water-based pigment ink containing carbon black as a colorant, and to a process for producing the same.

BACKGROUND OF THE INVENTION

Water-based dye ink containing a black dye has heretofore mainly been used as a recording solution for a writing implement or an ink-jet printer. However, in order to impart light and water resistances to a recorded image, water-based pigment ink which contains a pigment such as carbon black has been desired.

Carbon black commercially available for a colorant is acidic carbon black having a pit of not more than 7, which is prepared by oxidizing neutral carbon black with an oxidizing agent such as nitric acid. The neutral carbon black generally means a carbon black having a pH of about 7 prepared by cracking or imperfectly burning natural gas, and a hydrocarbon liquid such as heavy oil, tar and the like. The acidic carbon black itself does not have enough water-distensibility for use as a colorant of water-based pigment ink.

Therefore, carbon black is conventionally finely dispersed and stabilized in an aqueous medium by using various dispersing apparatuses in the presence of a dispersant such as water-soluble acrylic resin, styrene(meth)acrylic resin, styrene-maleic resin and amine.

Japanese Laid-Open Publication Nos. 64-6074 and 64-31881, for example, disclose water-based pigment ink which comprises acidic carbon black having a pH of not more than 5 and a dispersant (e.g., an anionic surfactant and a polymeric dispersant). Japanese Laid-Open Publication No. 3-210373 discloses ink for ink-jet printing which comprises acidic carbon black and a water-soluble resin.

In order to generate liquid drops stably through a fine orifice of an ink-jet printing head and to write smoothly with a fine tip of a ball point pen, the orifice or the tip have to be prevented from drying and setting.

When the water-based pigment ink comprising a dispersant is employed for ink-jet printing or fine-pen writing, a resin of the dispersant adheres to the orifice or the tip. The adhered resin is difficult to dissolve again, and the orifice or the tip may clog easily. Further, the water-based ink containing a dispersant is viscous, and it forms resistant force in a path to a nozzle of the ink-jet printing head when continuous or high-speed printing is conducted for a long period of time. The resistant force makes jetting of the ink unstable, which results in intermittent printing and recording.

Furthermore, such a conventional water-based pigment ink has to have relatively low concentration in order to reduce viscosity of the ink, which results in poor printing density as compared with water-based dye ink.

SUMMARY OF THE INVENTION

The present invention provides water-based pigment ink having high concentration which provides excellent jetting stability when used for an ink-jet printer and provides excellent writing stability when used for a fine-point pen.

The present invention provides water-based pigment ink comprising water and carbon black, wherein said carbon black has a surface active hydrogen content of not less than 1.5 mmol/g.

DETAILED DESCRIPTION OF THE INVENTION

The wording "surface active hydrogen content" means the amount (mmol/g) of active hydrogen which exists at a surface of a carbon black particle.

It is preferred that the carbon black for water-based pigment ink of the present invention has high surface active hydrogen content. Such a carbon black exhibits good water dispersibility.

The carbon black having high surface active hydrogen content has a lot of hydroxyl and carboxyl groups in the surface thereof, and the hydrophilic nature of the carbon black is improved. The surface area of the carbon black is also enlarged, so that the carbon black has chemical properties as an acidic dye, which results in good water dispersibility.

The surface active hydrogen content of the carbon black is preferably not less than 1.5 mmol/g, more preferably not less than 2.0 mmol/g. When it is less than 1.5 mmol/g, the water dispersibility becomes poor. On the other hand, when it is more than 5.0 mmol/g, production costs become high.

The surface active hydrogen content of carbon black is measured as follows according to the Zeisel procedure. That is, a diethyl ether solution of diazomethane is added dropwise to carbon black to substitute all active hydrogen on the carbon black with a methyl group. Hydroiodic acid having a specific gravity of 1.7 is added to the treated carbon black, and then the mixture is heated to evaporate the methyl group as methyl iodide. The resulting methyl iodide vapor is trapped with a silver nitrate solution to precipitate it as methylsilver iodide. The weight of the original methyl group, i.e. the amount of active hydrogen is measured from the weight of this methylsilver iodide.

The carbon black is contained in the present water-based pigment ink in an amount of 0.1 to 50% by weight, preferably 1 to 20% by weight, based on the total weight of the water-based pigment ink. When the amount of the carbon black is less than 1% by weight, printing or writing density becomes poor. On the other hand, when the amount is more than 20% by weight, the carbon black readily agglomerates and it may precipitate during storage for a long period of time, and therefore the Jetting stability becomes poor.

The average particle size of the carbon black is not more than 200 nm, preferably not more than 150 nm, more preferably not more than 100 nm. When the average particle size of the carbon black exceeds 200 nm, the carbon black readily precipitates.

Water-based pigment ink of the present invention can optionally contain a water-miscible organic solvent. The water-miscible organic solvent, water and a mixture thereof are referred to as "aqueous medium" throughout the specification.

Examples of the water-miscible organic solvent include alkyl alcohols having 1 to 4 carbon atoms such as methyl alcohol, ethyl alcohol, n-propyl alcohol, isopropyl alcohol, n-butyl alcohol, sec-butyl alcohol and isobutyl alcohol; ketones or ketone alcohols such as acetone and diacetone alcohol; ethers such as tetrahydrofuran (THF) and dioxane; alkylene glycols such as ethylene glycol, propylene glycol, diethylene glycol and triethylene glycol; polyalkylene glycols such as polyethylene glycol and polypropylene glycol; lower alkyl ethers of polyhydric alcohols, such as ethylene glycol monoethyl ether, propylene glycol monomethyl ether, diethylene glycol monoethyl ether and triethylene glycol monoethyl ether; lower alkyl ether acetates such as polyethylene glycol monomethyl ether acetate; glycerol; and pyrrolidones such as 2-methylpyrrolidone and N-methyl-2-pyrrolidone. The amount of these organic solvents to be used is not specifically limited, but is generally within a range of 3 to 50% by weight.

Water-based pigment ink of the present invention is preferably produced by the process which comprises the steps of:

(a) providing acidic carbon black; and (b) oxidizing the acidic carbon black with a hypohalite salt in water.

In the present specification, the term "acidic carbon black" means the carbon black which exhibits acidity because it has a carboxyl group on a surface of the particle. The acidic carbon black employed in the present water-based pigment ink has a pH of preferably not more than 6, more preferably not more than 4.

The acidic carbon black is generally prepared by oxidizing a neutral carbon black for colorant such as furnace black and channel black, appropriately. The process for oxidizing employed may be a conventional oxidizing method using a usual oxidizing agent such as nitric acid, ozone, hydrogen peroxide and nitrogen oxide, or a surface modification method such as a plasma treatment. The acidic carbon black is commercially available from Mitsubishi Kasei Co., Ltd. under the trade name of "MA100", "2400B" and "MA8" and from Tegusa Co. under the trade name of "Color Black FW200".

In order to oxidize the resulting acidic carbon black, a hypohalite salt is used in the present invention. Examples thereof include sodium hypochlorite, potassium hypochlorite and the like. Sodium hypochlorite is particularly preferred in view of reactivity.

The acidic carbon black is generally oxidized by; introducing the acidic carbon black and hypohalite salt (e.g., sodium hypochlorite, etc.) having an effective halogen content of 10 to 30% by weight into suitable amount of water; and stirring the resulting mixture at 50° C. or more, preferably 95° to 105° C., for 5 hours or more, preferably about 10 to 15 hours. The amount of the hypohalite salt employed may vary depending on its type actually employed, but it may be generally 1.5 to 75% by weight, preferably 4 to 50% by weight based on weight of the carbon black. The resulting carbon black has a surface active hydrogen content of not less than 1.5 mmol/g.

Then, the product (an oxidized product) is filtered and side produced salts are removed by washing with deionized water. The product is further purified with a separation membrane having a pore diameter of 0.01 μm or less, such as reverse osmosis membrane and ultrafiltration membrane. The purified product is then concentrated to provide a pigment-dispersed concentrate having a carbon black content of 10 to 30% by weight based on weight of the pigment-dispersed concentrate.

The pigment-dispersed concentrate can be used as water-based pigment ink as it is, but it preferably be reduced to have a carbon black content of 1 to 20% by weight based on weight of the water-based pigment Ink. The pigment-dispersed concentrate may be dried to prepare a pigment powder. The pigment-dispersed concentrate otherwise may be further concentrated to prepare a pigment paste having a pigment content of about 50% by weight, and the resulting pigment paste may be dried to prepare a pigment powder. The pigment powder or the pigment paste may be introduced in a suitable amount of an aqueous medium to give the water-based pigment ink of the present invention.

The water-based pigment ink of the present invention is sufficiently desalted and purified, and it does not corrode a writing implement or an ink-jet printer. On the surface of the present carbon black, at least a part of the carboxyl groups forms a carboxylic acid salt with an alkali metal derived from the hypohalite salt which was used as the oxidizing agent. Therefore, it Is not necessary to control the pH of the present water-based pigment ink. However, it is preferred to control the pH within a range of 8 to 10, similar to usual water-based dye ink, in order to achieve a good dispersion stability of the present water-based pigment ink for a long period of time.

Examples of a pH control agent which can be used include alkanolamines such as mono-, di- and triethanolamine; and hydroxides of alkali metals, such as sodium hydroxide, potassium hydroxide and lithium hydroxide.

The water-based pigment ink of the present invention can contain a suitable amount of additives such as viscosity control agent, mildewproofing agent and rustproofing agent, which are generally used for this kind of ink.

Further, to the water-based pigment ink of the present invention can optionally be added a water-soluble resin (e.g., a low condensate of vinyl pyrrolidone, a water-soluble alkyd resin or a water-soluble acrylic resin), an alcohol-soluble resin (e.g., phenol resin, acrylic resin, styrene-maleic resin or ketone resin), in order to impart gloss to the printed matter or the written letter. It is preferred that the weight ratio of the water-soluble or alcohol-soluble resin to the carbon black is not more than 1/10 in view of the jetting stability of the water-based pigment ink.

According to the present invention, the carbon black which was highly oxidized and which has excellent water dispersibility as compared with commercially available acidic carbon black as a colorant is provided. The present carbon black has an increased amount of a polar group (e.g., a phenolic, hydroxyl or carboxyl group) and has an enlarged surface area.

The present water-based pigment ink therefore has excellent dispersion stability for a long period of time, even if it does not contain a pigment-dispersed resin, a surfactant or the like, or even if it is not treated with a mechanical disperser.

The present water-based pigment ink has good recording/writing characteristics and it may preferably be employed for an ink-jet printer for high-speed printing and a writing implement for fast writing. The present water-based pigment ink hardly provides blurred printing or writing, even if it is used in such a disadvantageous condition.

The resulting printed matter has improved fastness (i.e., light and water fastness) as compared with those obtained by water-based dye ink. Furthermore, the printed matter has a density equal to or superior to a water-soluble black dye, because the carbon black may be contained at high concentration in the present water-based pigment ink.

EXAMPLES

The following Examples and Comparative Examples further illustrate the present invention In detail but are not to be construed to limit the scope thereof.

Example 1

After 300 g of commercially available acidic carbon black having a pH of 3.5 (MA-100, manufactured by Mitsubishi Kasei Co., Ltd.) was sufficiently mixed with 1000 ml of water, 450 g of sodium hypochlorite (an effective chlorine content of 12%) was added dropwise and the mixture was stirred at 100° to 105° C. for 10 hours. The resulting slurry was filtered through a Toyo filter paper No. 2 (manufactured by Advantis Co.) and washed with water until the pigment particle leaked out. This wet cake of the pigment was dispersed again in 3000 ml of water and desalted with a reverse osmosis membrane until electroconductivity of the dispersion became 0.2 mS. The resulting pigment dispersion (pH 8 to 10) was concentrated to have a pigment content of 10% by weight.

The resulting pigment dispersion was acidified with aqueous hydrochloric acid, purified with a membrane again, concentrated, dried and pulverized to give a powder of oxidized carbon black. The surface active hydrogen content of the oxidized carbon black was measured as described above. As a result, it was about 2.8 mmol/g.

Example 2

5 g of ethanol and 5 g of 2-methylpyrrolidone were added to 50 g of the pigment dispersion obtained in Example 1, and water was further added until the total weight became 100 g to obtain water-based pigment ink. Viscosity of this ink was not more than 2.0 cps/25° C. and the average particle size of the carbon black was 150 nm. The average particle size of the oxidized carbon black was measured with a laser beam diffusion grain size distribution measuring apparatus (LPA3000/3100, manufactured by Otsuka Denshi Co., Ltd.).

This ink was then loaded to an ink-jet printer having a normal nozzle for water-based dye ink (HG5130, manufactured by Epson Co.) and printed to a piece of paper. As a result, Jetting of the ink was stable, and printing was rapid and smooth. The resulting printed matter was dipped in water after drying, but no pigment was flowed out. Thus, water resistance of the printed matter was good.

The ink-jet printer was left for several hours at room temperature in order to dry Its nozzle. The printing procedure was repeated as described above after the leaving. As a result, the water-based pigment ink did not set and no failure of jetting was occurred.

This ink was then preserved at 50° C. for one month, and the appearance, the average particle size and the viscosity were examined. As a result, no pigment precipitated and its average particle size and viscosity did not change. The preserved ink was then printed by using the ink-jet printer again. As a result, jetting of the ink was stable and printing was smooth. Optical density of the solid printed part was measured using a Macbeth densitometer (TR-927, manufactured by Columogen Co.). The result obtained was 1.34, which value may be evaluated as satisfactory.

Example 3

After 300 g of commercially available acidic carbon black having a pH of 3.5 (MA8, manufactured by Mitsubishi Kasei Co., Ltd.) was sufficiently mixed with 1000 ml of water, 450 g of sodium hypochlorite (an effective chlorine content of 12%) was added dropwise and the mixture was stirred at 100° to 105° C. for 8 hours. The resulting slurry was filtered through a Toyo filter paper No. 2 and washed with water until the pigment particle leaked out. This wet cake of the pigment was dispersed again in 3000 ml of water and the resulting dispersion was desalted with a reverse osmosis membrane until electroconductivity of the dispersion became 0.2 mS. This dispersion was then concentrated until a pigment content of the dispersion became 10% by weight.

The resulting pigment dispersion was acidified with aqueous hydrochloric acid, purified with a membrane again, concentrated, dried and pulverized to give a powder of oxidized carbon black. The surface active hydrogen content of the resulting oxidized carbon black was measured as described above. As a result, it was about 2.5 mmol/g.

Example 4

5 g of ethanol and 5 g of 2-methylpyrrolidone were added to 50 g of the pigment dispersion solution obtained in Example 3, and water was further added until the total weight became 100 g to obtain water-based pigment ink. Viscosity of this ink was not more than 1.8 cps/25° C. and the average particle size of the carbon black was 100 nm.

This ink was then loaded to an ink-jet printer having a normal nozzle for water-based dye ink and printed to a piece of paper as described in Example 2. As a result, jetting of the ink was stable and printing was rapid and smooth. The resulting printed matter was dipped in water after drying, but no pigment was flowed out. Thus, water resistance of the printed matter was good.

The ink-jet printer was left for several hours at room temperature in order to dry its nozzle. The printing procedure was repeated as described above after the leaving. As a result, the water-based pigment ink did not set and no failure of jetting was occurred.

This ink was then preserved at 50° C. for one month, and the appearance, the average particle size and the viscosity were examined. As a result, no pigment precipitated and its average particle size and viscosity did not change. The preserved ink was then printed by using the ink-jet printer again. As a result, jetting of the ink was stable and printing was smooth.

Comparative Example 1

Water-based pigment ink was prepared by adding 85 g of water, 5 g of ethanol and 5 g of 2-methylpyrrolidone to 5 g of acidic carbon black having a pH of 3.5 (MA-100, manufactured by Mitsubishi Kasei Co.) to have the total weight of 100 g, followed by sufficient stirring. The acidic carbon black was not dispersed in water at all. When the resulting ink was left for several minutes at room temperature, a supernatant was formed, and the ink cannot be employed for printing. The surface active hydrogen content of the resulting acidic carbon black was measured. As a result, it was 0.13 mmol/g.

Comparative Example 2

To 100 g of an acidic carbon black having a pH of 3.5 (MA-100, manufactured by Mitsubishi Kasei Co.), 100 g of an aqueous acrylic resin solution (Johncryl J-62, manufactured by Johnson Polymer Co.) and 300 g of water were added, and the mixture was dispersed for 5 hours using a horizontal beads mill to give a dispersion having an average particle size of 150 nm.

5 g of ethanol and 5 g of 2-methylpyrrolidone were added to 25 g of the resulting dispersion, and water was added until the total weight became 100 g to obtain water-based pigment ink.

Viscosity of the water-based pigment ink was 4 cps/25° C. and dispersion stability was good. This ink was loaded to an ink-jet printer having a normal nozzle for water-based dye ink and printed to a piece of paper. As a result, jetting stability of ink became poor, gradually, and printing density also became low.

The ink-jet printer was left for several hours at room temperature in order to dry its nozzle. The printing procedure was repeated as described above after the leaving. As a result, the water-based pigment ink set and the printing density further became low. Upon repeating this printing procedure, jetting of the ink stopped irregularly, and thereafter it stopped completely.

Comparative Example 3

According to the same manner as described in Comparative Example 2 except for adding 10 g of diethylene glycol, 10 g of 2-methylpyrrolidone and 55 g of water in place of 5 g of ethanol, 5 g of 2-methylpyrrolidone and 65 g of water, water-based pigment ink was prepared. The printing density of this ink is low, but it can be employed for printing repeatedly and did not cause failure of jetting at the nozzle.

This ink was then preserved at 50° C. for one month and the average particle size and the viscosity were measured. As a result, the average particle size was increased to 200 nm and the viscosity was increased to 7 cps/25° C. The preserved ink was dispersed again with stirring and printed by the ink-jet printer. As a result, a nozzle of the ink-jet printer was clogged with the agglomerated pigment and jetting of the ink stopped.

Comparative Example 4

Neutral carbon black, which was not oxidized (45 L, manufactured by Mitsubishi Kasei Co.), was dispersed in 30 ml of water and 5 g of sodium hypochlorite (an effective chlorine concentration of 12%) was added, and then the mixture was left at room temperature (20° to 25° C.) for 24 hours. Thereafter, the supernatant formed was removed, and the precipitated cake of carbon black was dispersed in methanol and filtered.

The reaction solvent was substituted with methanol by repeating this procedure, and side produced salt was completely removed, followed by drying to give a powder of oxidized carbon black.

To 5 g of the resulting oxidized carbon black (pH 8), 85 g of water, 5 g of ethanol and 5 g of 2-methylpyrrolidone were added to have the total weight of 100 g, and the mixture was then sufficiently stirred to give water-based pigment ink. The ink formed a supernatant by standing, and it can not be employed for printing.

As shown in the following Table 1, the surface active hydrogen content and water dispersibility of the oxidized carbon black obtained in Examples 1 and 3 of the present invention, a commercially available acidic carbon black (MA100, 2400B and 45L, manufactured by Mitsubishi Kasei Co., Ltd.) and an acidic carbon black [Color black FW200 (trade name), manufactured by Degsa Co.] were compared.

The content of the active hydrogen of the oxidized carbon black obtained in the present invention was about 2.0 mmol/g or more. To the contrary, the active hydrogen content of MA100, 2400B and 45L was about 0.13 mmol/g, 0.58 mmol/g and 0.06 mmol/g, respectively.

Water dispersibility of the carbon blacks was then evaluated by measuring stability in water with time. As a result, the carbon black obtained in the present invention was dispersed in water rapidly and finely, and was stable even after standing for 60 days. On the other hand, the commercially available carbon blacks floated on the water surface at the initial stage of dispersing, or precipitated with time.

As described above, the active hydrogen content of the carbon black in the present water-based pigment ink is considerably large as compared with a conventional product. Therefore, it is reasonable that the present water-based pigment ink of the present invention is marvelously superior in water dispersibility.

The average particle size of the carbon black contained in the present water-based pigment ink may be controlled to approximately 150 nm in a simple water-based system without dispersing for long time while applying a strong shear using various dispersing apparatuses, and without the presence of the dispersion resin and dispersant.

It was also observed that the secondary agglomerated carbon black (so-called agglomerate in liquid) was finely dispersed because the polar group of the surface was sufficiently miscible with water.

TABLE 1

| Carbon black | Water dispersibility | | | | Surface active hydrogen content (mmol/g) |
|---|---|---|---|---|---|
| | Acidic atom.[1] | | Alkaline atom. | | |
| | Affin.[2] | Stabil.[3] | Affin. | Stabil. | |
| Ex. 1 | ⊙ | >60 day | ⊙ | >60 day | ca. 2.8 |
| Ex. 3 | ⊙ | >60 day | ⊙ | >60 day | ca. 2.5 |
| FW200 | Δ | <10 min | Δ | <10 min | ca. 1.2 |
| 2400B | x | <2 min | x | <2 min | ca. 0.58 |
| MA100 | x | <1 min | x | <1 min | ca. 0.13 |
| 45L | x | — | x | — | ca. 0.06 |

[1]atmosphere
[2]Affinity
[3]Stability
[Evaluation]
⊙: Dispersed rapidly and finely and superior in water affinity.
Δ: Dispersed but poor in water affinity.
x: Not dispersed in water at all.

What is claimed is:

1. Water-based pigment ink comprising water and carbon black, wherein said carbon black has a surface active hydrogen content of not less than 1.5 mmol/g.

2. The water-based pigment ink according to claim 1, wherein the carbon black has a surface active hydrogen content of not less than 2.0 mmol/g.

3. The water-based pigment ink according to claim 1, wherein the carbon black is contained in an amount of 0.1 to 50% by weight based on the total weight of the water-based pigment ink.

4. The water-based pigment ink according to claim 1, wherein the carbon black is contained in an amount of 1 to 20% by weight based on the total weight of the water-based pigment ink.

5. The water-based pigment ink according to claim 1, wherein the average particle size of the carbon black is not more than 200 nm.

6. The water-based pigment ink according to claim 1, wherein the average particle size of the carbon black is not more than 100 nm.

7. The water-based pigment ink according to claim 1, wherein said carbon black contains carboxyl groups on the surface thereof and at least a part of said carboxyl groups forms carboxylic acid salt with an alkali metal.

8. A process for producing a pigment suitable for water-based pigment ink comprising the steps of:
   (a) providing acidic carbon black; and
   (b) oxidizing the acidic carbon black with a hypohalite salt in water.

9. The process for producing water-based pigment ink according to claim 8, wherein the acidic carbon black has a pH of not more than 6.

10. The process for producing water-based pigment ink according to claim 8, wherein the acidic carbon black has a pH of not more than 4.

11. The process for producing water-based pigment ink according to claim 8, wherein the hypohalite salt is selected from the group consisting of sodium hypochlorite and potassium hypochlorite.

12. The process for producing water-based pigment ink according to claim 8, further comprising the step of:
   (c) washing with water; and
   (d) purifying and concentrating with a separation membrane having a pore diameter of not more than 0.01 μm.

13. The process for producing a pigment suitable for water-based pigment ink according to claim 8, wherein the step (b) for oxidizing the acidic carbon black, is conducted at a temperature of not less than 50° C.

14. The process for producing a pigment suitable for water-based pigment ink according to claim 13, wherein the resulting oxidized carbon black has a surface active hydrogen content of not less than 1.5 mmol/g.

15. The water-based pigment ink according to claim 1, wherein said carbon black (a) has a surface active hydrogen content of not less than 2.0 mmol/g; (b) is contained in an amount of 1 to 20% by weight based on the total weight of the water-based pigment; and (c) has an average particle size of not more than 200 nm.

16. The water-based pigment ink according to claim 2, wherein the average particle size of the carbon black is not more than 200 nm.

17. The water-based pigment ink according to claim 2, wherein the average particle size of the carbon black is not more than 100 nm.

* * * * *